(12) United States Patent
Gordon et al.

(10) Patent No.: US 7,897,028 B2
(45) Date of Patent: Mar. 1, 2011

(54) PROCESS FOR THE RECOVERY OF MATERIALS FROM A DESULFURIZATION REACTION

(75) Inventors: John H. Gordon, Salt Lake City, UT (US); Ashok V. Joshi, Salt Lake City, UT (US)

(73) Assignee: Ceramatec, Inc., Salt Lake City, UT (US)

( * ) Notice: Subject to any disclaimer, the term of this patent is extended or adjusted under 35 U.S.C. 154(b) by 1688 days.

(21) Appl. No.: 10/905,782

(22) Filed: Jan. 20, 2005

(65) Prior Publication Data

US 2005/0161340 A1    Jul. 28, 2005

Related U.S. Application Data

(60) Provisional application No. 60/539,140, filed on Jan. 26, 2004.

(51) Int. Cl.
C10G 25/12 (2006.01)

(52) U.S. Cl. .......... 205/406; 205/407; 205/408; 205/409

(58) Field of Classification Search ........... 205/406–409
See application file for complete search history.

(56) References Cited

U.S. PATENT DOCUMENTS

| | | |
|---|---|---|
| 1,501,756 A | 7/1924 | Downs |
| 3,284,325 A | 11/1966 | Gibson et al. |
| 3,785,965 A | 1/1974 | Welty |
| 3,787,315 A | 1/1974 | Bearden, Jr. et al. |
| 3,788,978 A | 1/1974 | Bearden, Jr. et al. |
| 4,076,613 A | 2/1978 | Bearden, Jr. |
| 4,323,437 A * | 4/1982 | Mucenieks .................. 205/536 |
| 5,057,194 A | 10/1991 | Stewart et al. |
| 5,695,632 A | 12/1997 | Brons et al. |
| 6,210,564 B1 | 4/2001 | Brons et al. |
| 6,368,486 B1 | 4/2002 | Thompson et al. |
| 6,787,019 B2 | 9/2004 | Jacobson et al. |

OTHER PUBLICATIONS

Material Safety Data Sheet on Sodium Chloride Aug. 17, 2009.*
Gilliquet, J. "Written Opinion for PCT/US2006/002036 sent Aug. 2, 2007", 1-8
Gilliquet, J. "International Search Report", PCT/US2006/002036, (Dec. 20, 2006),1-3.
Guilliquet, J. "Written Opinion of the International Searching Authority", PCT/US2006/002036. (Dec. 20, 2006),1-6.

* cited by examiner

*Primary Examiner* — Arun S Phasge
(74) *Attorney, Agent, or Firm* — David Fonda

(57) ABSTRACT

Disclosed herein is an improved method for regenerating materials from a desulfurization/demetallation reaction. The desulfurization/demetallation reaction preferably has products including one or more of an alkali sulfide, polysulfide or hydrosulfide, or alkali earth sulfide, polysulfide, or hydrosulfide. The method includes the steps of reacting the desulfurization/demetallation products with a halogen, liberating and removing sulfur from the product, and then electrolyzing the halogenated products to separate the halogen from the alkali metal or alkali earth metal.

20 Claims, 2 Drawing Sheets

PROCESS FOR THE RECOVERY OF MATERIALS FROM A DESULFURIZATION REACTION

CROSS REFERENCE TO RELATED APPLICATIONS

This application is a continuation in part, claiming priority to U.S. Provisional Patent Application No. 60/539,140, filed on Jan. 26, 2004.

1. FIELD OF THE INVENTION

The present invention relates to the regeneration of alkali metal and alkali earth metal from sulfides, polysulfides and hydrosulfides of those metals. In particular, the present invention provides a beneficial process for the recovery of metals from the desulfurization and demetallation of sulfur- and metal-bearing petroleum oil distillate, crude, heavy oil or bitumen, in particular where alkali metal and alkali earth metal is used to remove the sulfur and metal from those materials.

2. DISCUSSION OF THE PRIOR ART

The demand for energy and the hydrocarbons from which that energy is derived is continually rising. The hydrocarbon raw materials used to provide this energy, however, contain difficult to remove sulfur and metals that hinder their usage. Sulfur can cause air pollution, and can poison catalysts designed to remove hydrocarbons and nitrogen oxide from motor vehicle exhaust. Similarly, other metals contained in the hydrocarbon stream can poison catalysts typically utilized for removal of sulfur through standard and improved hydro-desulfurization processes whereby hydrogen reacts under extreme conditions to break down the sulfur bearing organo-sulfur molecules.

One example of a key source of hydrocarbon fuel where the removal of sulfur poses a problem is in heavy oils such as the bitumen existing in ample quantities in Alberta, Canada and Venezuela. In order to remove sufficient sulfur from the bitumen for it to be useful as an energy resource, excessive hydrogen must be introduced under extreme conditions, which creates an inefficient and economically undesirable process.

Over the last several years, sodium has been recognized as being effective for the treatment of high-sulfur petroleum oil distillate, crude, heavy oil and bitumen. Sodium is capable of reacting with the oil and its contaminants to dramatically reduce the sulfur, nitrogen, and metal content through the formation of sodium sulfide compounds (sulfide, polysulfide and hydrosulfide). Examples of the processes can be seen in U.S. Pat. Nos. 3,785,965; 3,787,315; 3,788,978; 4,076,613; 5,695,632; 5,935,421; and 6,210,564.

Although the effectiveness of the use of sodium in the removal of sulfur has been repeatedly demonstrated, the process is not commercially practiced because a practical, cost-effective method to regenerate the sodium has not yet heretofore been proposed. Several researchers have proposed the regeneration of sodium using an electrolytic cell, which uses a sodium-ion-conductive beta-alumina membrane. Beta-alumina, however, is both expensive and fragile, and no significant metal production utilizes beta-alumina as a membrane separator. Further, the cell utilizes a sulfur anode, which results in high polarization of the cell causing excessive specific energy requirements.

Metallic sodium is commercially produced almost exclusively in a Downs-cell such as the cell described in U.S. Pat. No. 1,501,756. Such cells electrolyze sodium chloride that is dissolved in a fused salt electrolyte to form molten sodium at the cathode and chlorine gas at the anode. The cells operate at a temperature near 600 C, a temperature compatible with the electrolyte used. Unlike the sulfur anode, the chlorine anode is utilized commercially both with molten salts as in the co-production of sodium and with saline solution as in the co-production of sodium hydroxide.

Another cell technology that is capable of reducing electrolyte melting range and operation of the electrolyzer to less than 200 C has been disclosed by Jacobsen et al in U.S. Pat. No. 6,787,019, and Thompson et al in U.S. Pat. No. 6,368,486. In those disclosures, low temperature co-electrolyte is utilized with the alkali halide to form a low temperature melting electrolyte.

It is an object of the present invention to provide a cost-effective and efficient method for the regeneration of alkali metals and alkali halide metals used in the desulfurization and demetallation of hydrocarbon streams. As will be described herein, the present invention is able to remove contaminants and separate out unwanted material products from desulfurization/demetallation reactions, and then recover those materials for later use.

This and other objects will become apparent to one of ordinary skill in the art after a review of the specification, claims and drawings appended hereto.

SUMMARY OF THE INVENTION

The present invention disclosed herein is an improved method for regenerating materials from a desulfurization/demetallation reaction. The method includes the steps of (1) contacting a desulfurization/demetallation product, such as an alkali sulfide, alkali polysulfide, alkali hydrosulfide, alkali earth sulfide, alkali earth polysulfide, or an alkali earth hydrosulfide, with a halogen material; (2) reacting the desulfurization/demetallation product with the halogen material to, in turn, halogenate the same and remove the sulfur from the product; (3) separating out and removing the sulfur; (4) dissolving the halogenated desulfurization/demetallation product into a conductive solution of halide salts; and electrolyzing the halogenated desulfurization/demetallation product, which will separate the alkali metal or alkali earth metal from the halogen. Preferably, the conductive solution discussed above has a lower melting point than alkali metal halides, or alkali earth metal halides. By completing these steps, purified hydrocarbons, such as bitumen or oil, can be produced, while recovering sulfur, alkali metals and alkali earth metals in the process. Preferably, the alkali metals and alkali earth metals can be recycled for use in further desulfurization/demetallation reactions.

Examples of desulfurization/demetallation products include lithium sulfide, alloys of lithium complexed with sulfur, sodium sulfide, and alloys of sodium complexed with sulfur, as well as additional metal constituents such as vanadium, iron and nickel. The halogen used in the above process can include bromine, chlorine or other compatible halogen materials.

Where additional metal constituents are included in the desulfurization/demetallation product, it is preferable to react those constituents with the halogen as well, to halogenate the same and separate those metals from the sulfur material. Thereafter, the halogenated additional metal constituents are preferably mixed with additional alkali metals or alkali earth metals, and reacted with those metals to reduce the metal constituents to their metallic state. The metallic constituents can then be separated and removed, and used for other third party applications, such as manufacture of stainless steel.

DETAILED DESCRIPTION OF THE INVENTION

Figure 1:
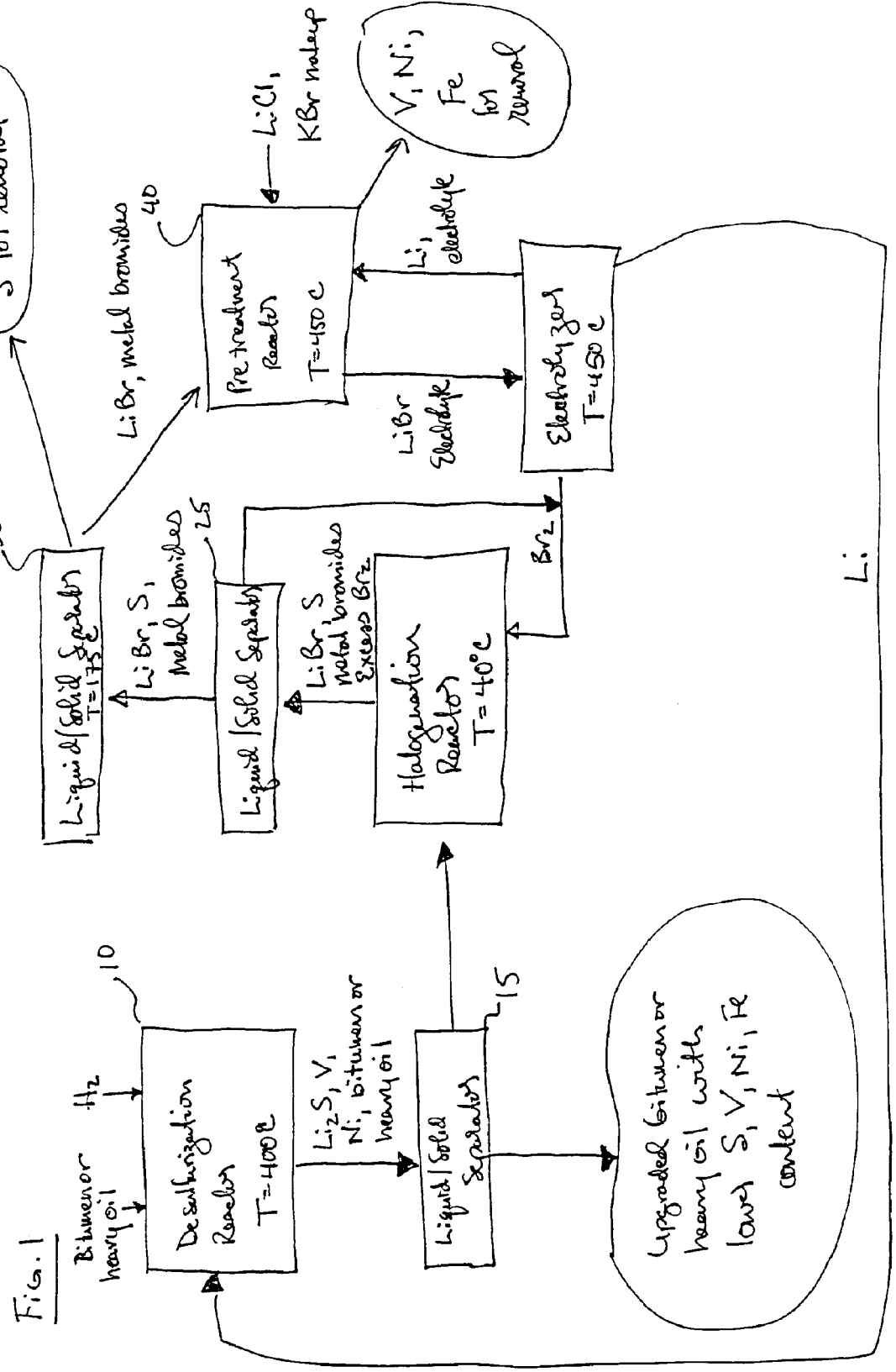
FIG. 1 comprises a schematic drawing of one preferred embodiment of the present invention.

While this invention is susceptible of embodiment in many different forms, there is shown in the drawings and will herein be described in detail one or more embodiments with the understanding that the present disclosure is to be considered as an exemplification of the principles of the invention and is not intended to limit the invention to the embodiments illustrated.

The process of the present invention provides an efficient manner for the removal and recovery of sulfur and other metals from processes used to refine and purify hydrocarbon sources such as crude oil and bitumen. Prior art processes of desulfurization and demetallation relying on alkali earth metals and alkali metals provide a product stream substantially free of sulfur contamination. Derivatives of this process include alkali or alkali earth metal compounds of sulfide, polysulfide, and hydrosulfides, as well as other contaminants such as vanadium, nickel and iron. The present method enables the removal and recovery of all of these materials for later use.

One preferred embodiment of the method of the present invention is shown herein in FIG. 1. The method is preferably used with the products of a desulfurization/demetallation reaction in which the desulfurization and demetallation has been accomplished with the use of alkali metals or alkali earth metals, as described above. For exemplary purposes, the method will be illustrated using lithium as the desulfurization agent, and with lithium sulfide as the product from the desulfurization/demetallation reaction. In the method, the product stream from the desulfurization/demetallation reaction 10, containing lithium sulfide, vanadium, iron and nickel, is separated from the purified bitumen/oil via liquid/solid separator 15. Thereafter, the lithium sulfide, vanadium, iron and nickel are contacted with a halide, such as bromine or chlorine, in a halogenation reactor 20. The lithium sulfide reacts with bromine as follows:

(Equation 1)

The halogenation reactor 20 can operate within a wide range of temperatures, reacting the alkali sulfide or polysulfide with either a liquid or gaseous halogen. For example, where bromine is the halogen reactant, the halogenation reactor 20 can operate at a combined temperature and pressure sufficient to maintain the bromine in the desired physical state. Consistent with FIG. 1 the bromination reaction is conducted with bromine in the liquid state near ambient temperature. The bromination reaction may be conducted at ambient temperature and pressure with the assistance of a grinder or similar operator for grinding the sulfide, polysulfide or hydrosulfide to remove reaction products. Alternatively, the reaction can be conducted at elevated temperature either above the melting temperature of the halide (552 C in the case of lithium bromide) or in the presence of halide salts as described below, which can reduce the melting temperature of the salts collectively.

The halogenation of the lithium sulfide produces a pure sulfur stream, and a mixture of excess bromine, lithium bromide, and brominated metals. The sulfur can be separated from the lithium bromide, bromine and brominated metals through any number of conventional means, depending on the operating temperature. If the bromination is conducted at ambient temperature, the bromine is in a liquid state, and the sodium and halogenated lithium and metals are in solid form, such that the bromine can be easily separated from the remaining solid halide/sulfur mixture through a solid/liquid separator 25, such as a filtration apparatus. Thereafter, the solid halide/sulfur mixture can be heated to 150-200 C, above the melting temperature of sulfur, and the liquid sulfur can be separated from the solid halides. The lithium bromide (along with the other metallic contaminants of vanadium, nickel and iron, amongst others) can then be fed to a pretreatment reactor 40 for the removal of the non-alkali metals.

In the pretreatment reactor 40, the products of the halogenation reaction (other than the sulfur) are mixed with electrolyte salts to form a melt. For example, lithium chloride, lithium bromide and potassium bromide can be mixed with the lithium bromide to reduce the melting temperature and viscosity of the mixture. A 34 mole % LiCl, 32.5 mole % LiBr, 33.5 mole % KBr mixture melts under 350 C. It is preferable to select salts that decompose at voltages higher then lithium bromide since ultimately the lithium bromide is to be electrolyzed after the pretreatment step. LiCl and KBr both decompose at higher voltages compared to LiBr, therefore they are acceptable to add to a melt to reduce the melting temperature. During this step, additional lithium (or other alkali/alkali earth metal) can be added to the melt, and the non-alkali metal cations will be reduced to the metallic state for precipitation.

(Equation 3)

(Equation 4)

(Equation 5)

In each case, any non-alkali metal cations are reduced to the metallic state after coming in contact with the molten lithium. These metals can then be removed from the melt via filtering or dredging. The filtered/dredged non-alkali metals provide excellent raw materials for other external reactions, including the manufacture and production of stainless steel materials. Using a halide salt mixture to reduce the melting temperature and viscosity enables this process to be conducted around 400 C where corrosion is less than corrosion at the higher temperature that would be required if the process operated above the melting temperature of lithium bromide (552 C). Also the lower viscosity of a halide melt mixture improves the solid/liquid separation of the solid non-alkali metals from the liquid melt.

After removal of the non-alkali metals, the lithium bromide and halide salt mixture is fed to an electrolytic cell 50 for final decomposition. The cell 50 may be similar in construction to a standard Downs-type cell. In the case where lithium bromide is decomposed, the cell may be operated at a temperature in the 400-450 C range compared to 550-600 C for typical Downs cell operation because the lithium bromide salt mixture mentioned above melts lower than the Downs cell electrolyte. Cast iron or steel cathodes and graphite anodes may be used as in the Downs cell. Cell voltage must be somewhat higher than the decomposition voltage of about 3.25 V. Typically the cells would operate 1-2 V higher than the decomposition voltage to overcome polarization and voltage drop due to the resistances of the electrolyte and electrodes. A direct electric current is applied to the cell, and the alkali metal (lithium in this case) or alloys of that metal form at the cathode, and gaseous bromine (BP 59 C) is evolved at the anode.

Figure 2:
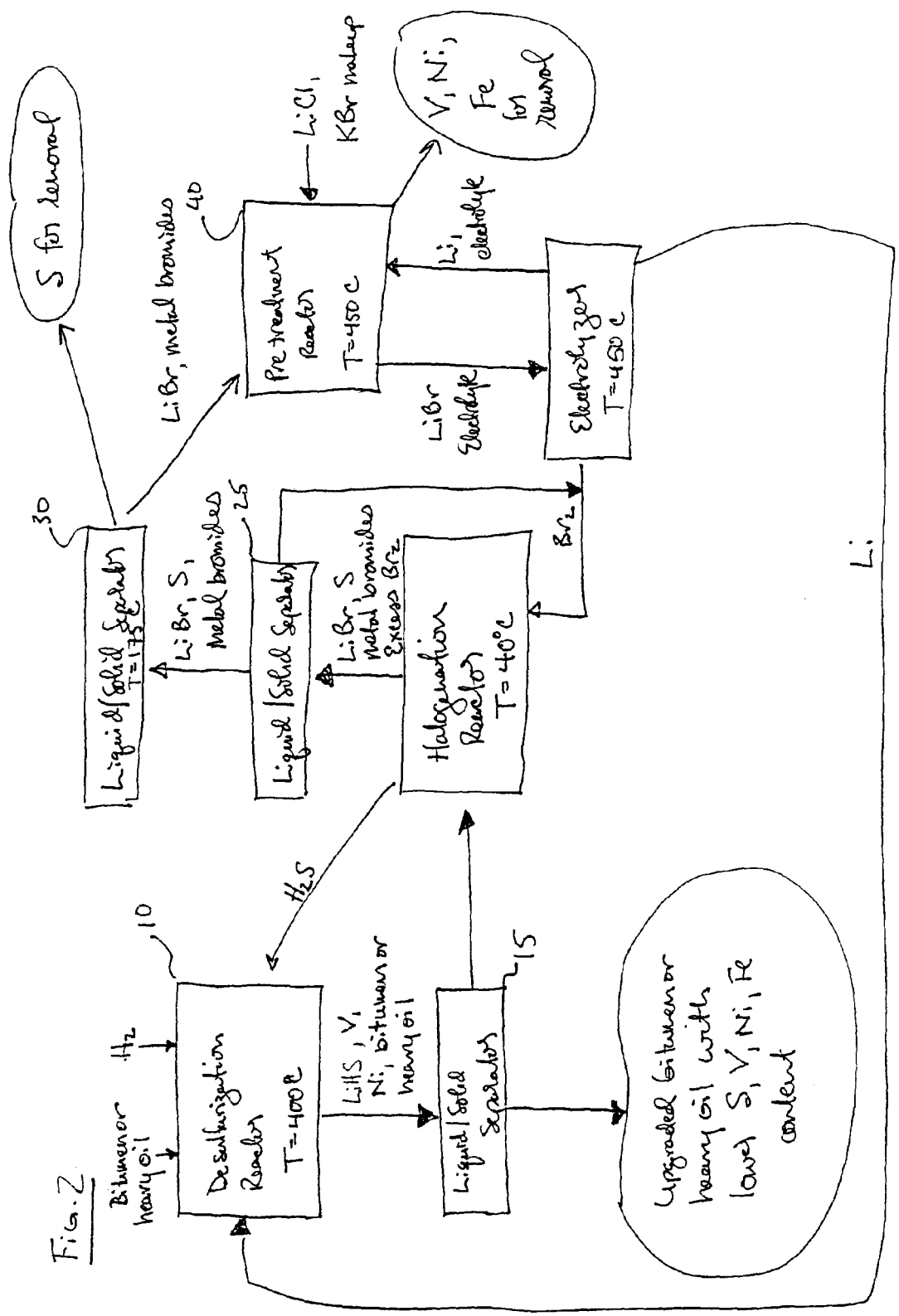
FIG. 2 comprises a schematic drawing of another preferred embodiment of the present invention.

An alternative embodiment of the method of the invention is depicted in FIG. 2, in which the products of the desulfurization/demetallation reaction 10 comprise alkali hydrosulfides or alkali earth hydrosulfides, such as lithium hydrosulfide. Again, the desulfurization/demetallation reaction products, including the hydrosulfide product, and other metals such as vanadium, iron and nickel, are fed into a halogenation reactor 20 for halogenation. As an example, lithium hydrosulfide is delivered from the desulfurization/demetallation reaction 10 to a halogenation reactor 20 in FIG. 2.

In the halogenation reactor 20, the lithium hydrosulfide is combined with bromine according to the following reaction:

LiSH+½Br$_2$→LiBr+½S+½H$_2$S　　　　(Equation 6)

In contrast to the reaction of lithium sulfide and lithium polysulfide in the bromination reactor, lithium hydrosulfide additionally produces hydrogen sulfide (MP −86 C, BP −60 C). Thus, the reactants from the halogenation reactor 20 are passed to the liquid/gas separator 30, including gaseous sulfur and gaseous hydrogen sulfide. The remaining products of the reaction, including the lithium bromide, and other non-alkali metals, can be separated using the same process shown in FIG. 1. The products are fed to a pre-treatment reactor 40, where the non-alkali metals are removed, and then to an electrolyzer 50 to separate the lithium and the halogen.

As an alternative, if the product of the desulfurization/demetallation reaction is an alkali metal sulfide, it may be preferable to first decompose the hydrosulfide to an alkali metal sulfide and hydrogen sulfide. To do so, the alkali metal hydrosulfide should be heated under low hydrogen sulfide pressure conditions, to form the sulfide and hydrogen sulfide gas.

The present process can be utilized with any desulfurization/demetallation reaction that utilizes an alkali metal or an alkali earth metal for removal of sulfur. The process may be undertaken as a continuous, batch or semi-batch process, as needed, and designed appropriately for such a process. Depending upon the prior desulfurization/demetallation process, any compatible halogen may be used. Preferably, however, bromine is utilized with the present process due to its lower decomposition voltage (for the electrolytic separation) to maximize efficiency.

Several examples of the above process will be described herein below.

EXAMPLE 1

Cold Bromination with Sulfide or Polysulfide

This first example applies to recovery of alkali metal from sodium sulfide, sodium polysulfide, lithium sulfide, or lithium polysulfide. In this example, liquid bromine is reacted with the solid alkali sulfide or polysulfide to form alkali bromide such as sodium bromide or lithium bromide. An advantage of this approach is the low reaction temperatures that allow the usage of longer lasting, lower cost materials in the reaction vessels. Bromine vaporizes at 59 C; sulfur melts at 115 C, while the sodium bromide and lithium bromide melt at 755 C and 547 C respectively. To remove the bromide reaction product and sulfur from the surface of the reactant, milling may be used. For example, an attrition mill or ball mill promotes mixing of the reactants and removal of passivation layers. Such mills may be operated in batch mode or continuous mode, cooling may be required depending on the intensity of the milling to keep the temperature below the boiling point of bromine or alternatively the milling may operate under pressure to suppress boiling of the bromine. After reaction the slurry can be filtered to remove bromine from the solids consisting of sulfur and alkali bromide. Filtered bromine can be reused for further bromination. Next the solids are heated to approximately >150 C to liquefy the sulfur to promote separation of the alkali bromide from the sulfur. Additional reaction stages may be introduced either to reduce the amount of sodium content in the sulfur product or to reduce the amount of sulfide in the alkali bromide.

After forming the alkali bromide, the bromide may be added directly to an electrolytic cell or pretreated to remove non-alkali metals. The pretreatment consists of mixing the bromide with other salts to form a relatively low temperature melt. Where lithium is the intended alkali metal to be cycled for desulfurization, the melt can be low melting. An example electrolyte is 34% LiCl, 32.5% LiBr, and 33.5% KBr which melts at less than 350 C. The mixture of salts melts lower than any of the salts individually. But LiBr has the lowest decomposition voltage in the melt and is the constituent to preferentially electrolyze later in the cell. After the bromide salts have been added to the salt mixture melt, some lithium metal is added to the melt where it reacts with any non-alkali metal bromides such as vanadium, nickel, or iron bromides to form metallic vanadium, nickel, and iron and lithium bromide. The non-alkali metals being more dense and in a different phase than the melt can be separated by settling, filtering or the like. The treated melt can be transferred to the electrolytic cell, which may be very similar to the commercial Downs-cell. The Downs-cell has a steel cathode and graphite anode with steel mesh there between. The electrolyte melt is in contact with both electrodes and is free to flow through the mesh. As DC current is applied to the cell, bromine gas is evolved from the anode. A hood over the anode is used to collect the gas to chillers and storage where it can be used for subsequent bromination of sulfides. Concurrently, molten lithium is formed on the cathode. Since lithium metal is lighter than the melt it floats to the top where it can be suctioned out of the cell for use in further desulfurization. Lithium bromide must be added at about the same rate as consumed by the electrode reactions in a continuous or semi-continuous fashion to maintain the bath composition. Where sodium is the intended alkali metal to be cycled for desulfurization, all is the same as described for lithium above except that a different electrolyte must be utilized. Here the mixture will be of NaCl, NaBr, KBr and or CaBr$_2$ and BaBr$_2$. Again, the melt has a lower melting temperature than the individual salts and NaBr preferentially electrolyzes. Instead of cycling lithium to the desulfurization and demetallation, sodium is cycled.

EXAMPLE 2

Cold Bromination with Hydrosulfide

This second example applies to recovery of alkali metal from sodium hydrosulfide, or lithium hydrosulfide. The process is conducted very similar to Example 1 except as the bromine reacts with the alkali hydrosulfide to form alkali halide and free sulfur, additionally hydrogen sulfide gas is evolved. The hydrogen sulfide gas is collected and sent back to the desulfurization process. The alkali halide and sulfur are filtered from the bromine and the rest of the process is similar to Example 1. An advantage of cold bromination of the alkali hydrosulfide is that the bromine and hydrogen sulfide are in different phases so there is little opportunity for the inefficient formation of hydrogen bromide to occur.

EXAMPLE 3

Hot Bromination with Sulfide or Polysulfide

The advantage of hot bromination over cold bromination is that its reaction kinetics are faster at the higher temperature and reaction vessels potentially are smaller compared to cold bromination. To facilitate handling of the alkali bromide once formed, it is convenient to conduct the bromination reaction in a halide mixture with relatively low melting temperature compared to the individual halides. Thus a portion of the electrolyte from the cells, as described in Example 1, is pumped to a vessel where sodium sulfide, sodium polysulfide, lithium sulfide, or lithium polysulfide are intermixed. This mixture is reacted with bromine gas such that the alkali halide is formed and free sulfur is formed. The alkali halide becomes dissolved in the halide melt as it is formed. Examples of suitable reaction vessels include stirred reactors with bubbling injection ports for the bromine to enter or a packed tower where liquid melt constituents flow downward as bromine gas flows upward. The ratio of sulfide relative to halide melt should be such that the mixture stays in the liquid state as the composition changes. Depending on the actual operating temperature, which should be somewhat above the melting temperature of the halide electrolyte, the free sulfur will either be liquid or gaseous. In either case, separation of sulfur from the halide melt is straightforward because of density differences. After separation of the sulfur the halide melt is reacted with alkali metal as Example 1 then fed to the electrolytic cells where the alkali halide is electrolyzed to form bromine gas for further bromination and either lithium or sodium metal for further desulfurization.

EXAMPLE 4

Hot Bromination with Hydrosulfide

As mentioned in Example 2, having bromine and hydrogen sulfide in the same phase is undesirable because the inefficient back reaction to form hydrogen bromide. Preferably the hydrogen sulfide is removed prior to bromination. Alkali hydrosulfide is heated under vacuum to create low pressure of hydrogen sulfide to promote the release of hydrogen sulfide from the alkali hydrosulfide. After substantial conversion of the alkali hydrosulfide to alkali sulfide, then the process is similar to Example 3.

EXAMPLE 5

Electrolysis with Down's Cell

Operation of the Down's cell to produce sodium from a melt containing NaCl, $CaCl_2$ and $BaCl_2$ is well known and described in the prior art. Such cells have produced on a commercial scale sodium metal and chlorine gas, consuming sodium chloride salt. For the purposes of this invention, this mode of operation is a satisfactory path. Sodium can be used in the desulfurization process described in the prior art and chlorine can be used to chlorinate the sodium sulfide, sodium polysulfide, or sodium hydrosulfide formed as by-product of those processes. However, the preference is to use the Down's cell to form either lithium and bromine from lithium bromide in a suitable melt as described in Example 1 or sodium and bromine from sodium bromide in a suitable melt again as described in Example 1. An advantage of using bromine in the cycle over chlorine is the decomposition voltage of the bromides are lower than the chlorides, thus the cell is able to maintain the same current and produce the same molar amount of metal using less power and less energy. Another advantage is the bromine is less corrosive than chlorine, and therefore the materials in the vessels and gas ducts may be constructed from less expensive material or be expected to last longer. Another advantage of bromine over chlorine is that the melts have lower melting temperatures; therefore the cells are able to operate at lower temperature. Lower cell temperature extends cell life and decreases cost of operation.

EXAMPLE 6

Electrolysis with Co-electrolyte (Low Temp Electrolysis)

Jacobson et al. in U.S. Pat. No. 6,787,019 and Thompson et al. in U.S. Pat. No. 6,368,486 both describe co-electrolyte systems compatible with alkali halide salts to enable electrolysis from melts much lower in temperature than with halide salts alone. Using cold bromination described in Example 1 and 2 above, the alkali halide compatible with these low temperature melts can be prepared from the alkali sulfide, alkali polysulfide, or alkali hydrosulfide. With these co-electrolytes it is possible to produce the sodium and bromine in the temperature range between 100-175 C and lithium and bromine can be produced at temperatures somewhat above the melting temperature of lithium. With these low temperature systems, the Downs cell could be used, but as Jacobson and Thompson point out, the lower melting temperature enables utilization of more efficient cells with lower capital and power requirements such as the design based on a horizontal bank of stacked vertical flat cathodes and anodes, similar to the designs commonly used in the color-alkali industry to make sodium hydroxide and chlorine gas. Part of this invention includes the use of said co-electrolytes combined with alkali halide processed from alkali sulfide, alkali polysulfide, or alkali hydrosulfide in electrolyzes operating at relatively low temperatures to regenerate the alkali metal.

EXAMPLE 7

Desulfurization with H2S Wash Separation

Bitumen heavy oil is reacted with sodium metal and hydrogen at approximately 380 C and 500 psig pressure. Most of the organo-sulfur molecules react to form sodium sulfide and sulfur free organic molecules. Likewise, organo-nitrogen, organo-metal, and organo-oxygen molecules are similarly broken down to release the hetero-atoms. After reaction, hydrogen sulfide is introduced at 380 C and about 50 psig in about 150 mole per cent excess relative to the sodium sulfide to form sodium hydrosulfide. The sodium hydrosulfide forms a phase easily separated from the oil phase through centrifugation or filtration. The oil phase has substantially lower sulfur, metal, nitrogen, and oxygen content and is sent on for further upgrading to desired petroleum products. The sodium hydrosulfide is cooled and reacted with liquid bromine to form solid sulfur, solid sodium bromide and hydrogen sulfide gas. The hydrogen sulfide gas is recovered for further treatment of sodium sulfide to sodium hydrosulfide. The solid sulfur and solid sodium bromide are filtered from the liquid bromine then heated to >150 C where the sulfur becomes liquid is filtered from the sodium bromide. The sodium bromide is combined with other salts as described in Example 1 to form a low temperature melt. Liquid sodium is added to the melt to form V, Ni, & Fe from the respective bromides. These metals are filtered from the melt and the melt is fed to an electrolytic cell. Sodium is formed at the cathode and is sent to the desulfurization process and bromine is formed at the anode and is sent to the bromination process.

EXAMPLE 8

Desulfurization with Water Wash Separation

Bitumen heavy oil is reacted with sodium metal and hydrogen at approximately 380 C and 500 psig pressure. Most of the organo-sulfur molecules react to form sodium sulfide and sulfur free organic molecules. Likewise, organo-nitrogen, organo-metal, and organo-oxygen molecules are similarly broken down to release the hetero-atoms. Water is added to the reactor at 300 C and 200 psig at approximately 150 mol % relative to sodium sulfide. Then the mixture is cooled to <120 C where the hydrated sodium salts and reduced metals can be separated from the oil through centrifugation or filtration. The oil phase has substantially lower sulfur, metal, nitrogen, and oxygen content and is sent on for further upgrading to desired petroleum products. The salts that substantially consist of sodium sulfide but also include sodium hydroxide and non-alkali metals are cooled then reacted with liquid bromine to form solid sulfur, solid sodium bromide and hydrogen sulfide gas. Also 0.5 mole of oxygen gas is released for every mole of sodium hydroxide brominated. The sulfur and sodium bromide are further processed as in Example 7.

EXAMPLE 9

Desulfurization with Staged Sodium Addition

Like Example 7 except sodium and sulfur are added to the bitumen heavy oil as taught by Brons et al. in U.S. Pat. No. 6,210,564 to form sodium hydrosulfide. Once the sodium hydrosulfide is formed, it is processed as in Example 7.

EXAMPLE 10

Desulfurization with Alkali Earth Addition

Bitumen heavy oil is reacted with magnesium metal powder and hydrogen at approximately 380 C and 500 psig pressure. Most of the organo-sulfur molecules react to form magnesium sulfide and sulfur free organic molecules. Likewise, organo-nitrogen, organo-metal, and organo-oxygen molecules are similarly broken down to release the hetero-atoms. After reaction, hydrogen sulfide is introduced at 380 C and about 50 psig in about 150 mole per cent excess relative to the magnesium sulfide to promote coalescence. Excess hydrogen sulfide is recovered for reuse. The coalesced magnesium sulfide phase may be separated from the oil phase through centrifugation or filtration. The oil phase has substantially lower sulfur, metal, nitrogen, and oxygen content and is sent on for further upgrading to desired petroleum products. The magnesium sulfide is cooled and reacted with liquid bromine to form solid sulfur, solid magnesium bromide. The solid sulfur and solid magnesium bromide are filtered from the liquid bromine then heated to >150 C where the sulfur becomes liquid is filtered from the magnesium bromide. The magnesium bromide is combined with other salts such as potassium chloride, sodium chloride, and lithium chloride to form a low temperature melt. Liquid magnesium is added to the melt to form V, Ni, & Fe from the respective bromides. These metals are filtered from the melt and the melt is fed to an electrolytic cell. Magnesium is formed at the cathode and is sent to the desulfurization process and bromine is formed at the anode and is sent to the bromination process.

While specific embodiments have been illustrated and described, numerous modifications may come to mind without significantly departing from the spirit of the invention, and the scope of protection is only limited by the scope of the accompanying Claims.

What is claimed is:

1. A method for regenerating materials from a desulfurization/demetallation reaction, the method comprising the steps of:
   contacting a desulfurization/demetallation product with a halogen, wherein the product comprises one or more of an alkali sulfide, alkali polysulfide, alkali earth sulfide, and an alkali earth polysulfide, and wherein the product further comprises one or more non alkali metal constituents;
   reacting the product with the halogen to, in turn, halogenate the alkali or alkali earth metal and liberate the sulfur;
   separating and removing the sulfur;
   reacting the one or more non alkali metal constituents with the halogen to, in turn, halogenated at least a portion of the one or more non alkali metal constitutents;
   adding at least one of an alkali or alkali earth metal to the halogenated non alkali metal constituents;
   reacting the halogenated additional metal constituents with the alkali or an alkali earth metal to, in turn, reduce the non alkali metal constituents to their metallic state;
   removing the non alkali metal;
   dissolving the halogenated alkali metal or alkali earth metal into a conductive solution of halide salts; and
   electrolyzing the halogenated alkali metal or alkali earth metal to, in turn, separate the alkali metal or alkali earth metal from the halogen.

2. The method according to claim 1, wherein the product comprises one or more of a lithium sulfide and an alloy of lithium complexed with sulfur.

3. The method according to claim 1, wherein the product comprises one or more of a sodium sulfide and an alloy of sodium complexed with sulfur.

4. The method according to claim 1, wherein the halogen comprises bromine.

5. The method according to claim 1, wherein the halogen comprises chlorine.

6. The method according to claim 1, wherein, after the step of electrolyzing, the alkali metal or alkali earth metal is recycled for use in further desulfurization/demetallation reactions.

7. The method according to claim 1, additionally comprising the step of separating and removing the metallic additional metal constituents after the step of further reacting.

8. The method according to claim 1, wherein the additional metal constituents comprise one or more of vanadium, nickel and iron.

9. The method according to claim 1, wherein the conductive solution has a melting point below the halogenated alkali metal or alkali earth metal.

10. A method for regenerating materials from a desulfurization/demetallation reaction, the method comprising the steps of:
    contacting a desulfurization/demetallation product with a halogen, wherein the product comprises one or more of an alkali hydrosulfide, and an alkali earth hydrosulfide;

reacting the product with the halogen to, in turn, halogenate the alkali or alkali earth metal and liberate sulfur and hydrogen sulfide;

separating the hydrogen sulfide from the sulfur;

separating the sulfur and hydrogen sulfide from the halogenated alkali or alkali earth metal, and removing the sulfur and hydrogen sulfide;

dissolving the halogenated alkali metal or alkali earth metal into a conductive solution of halide salts; and electrolyzing the halogenated alkali metal or alkali earth metal to, in turn, separate the alkali metal or alkali earth metal from the halogen.

11. The method according to claim 10, wherein the separated hydrogen sulfide is recycled for use in further desulfurization/demetallation reactions.

12. The method according to claim 10, wherein the product comprises a lithium hydrosulfide, or an alloy of lithium complexed as a hydrosulfide.

13. The method according to claim 10, wherein the product comprises a sodium hydrosulfide, or an alloy of sodium complexed as a hydrosulfide.

14. The method according to claim 10, wherein the halogen comprises bromine.

15. The method according to claim 10, wherein the halogen comprises chlorine.

16. The method according to claim 10, wherein, after the step of electrolyzing, the alkali metal or alkali earth metal is recycled for use in further desulfurization/demetallation reactions.

17. The method according to claim 10, wherein the product additionally comprises one or more additional metal constituents which are neither alkali or alkali earth metals, the step of reacting additionally comprising the step of reacting the additional metal constituents with the halogen to, in turn, halogenate at least a portion of the additional metal constituents, the method comprising the additional steps of:

adding more of at least one of an alkali or alkali earth metal to the halogenated additional metal constituents; and further reacting the halogenated additional metal constituents with the alkali or an alkali earth metal to, in turn, reduce the additional metal constituents to their metallic state.

18. The method according to claim 17, additionally comprising the step of separating and removing the metallic additional metal constituents after the step of further reacting.

19. The method according to claim 17, wherein the additional metal constituents comprise one or more of vanadium, nickel and iron.

20. A method for regenerating materials from a desulfurization/demetallation reaction, the method comprising the steps of:

contacting a desulfurization/demetallation product with a halogen, wherein the product comprises one or more of an alkali hydrosulfide, and an alkali earth hydrosulfide and wherein the product further comprises one or more non alkali metal constituents;

reacting the product with the halogen to, in turn, halogenate the alkali or alkali earth metal and liberate sulfur and hydrogen sulfide;

separating the sulfur and hydrogen sulfide from the halogenated alkali or alkali earth metal, and removing the sulfur and hydrogen sulfide;

reacting the one or more non alkali metal constituents with the halogen to, in turn, halogenated at least a portion of the one or more non alkali metal constitutents;

adding at least one of an alkali or alkali earth metal to the halogenated non alkali metal constituents;

reacting the halogenated additional metal constituents with the alkali or an alkali earth metal to, in turn, reduce the non alkali metal constituents to their metallic state;

removing the non alkali metal;

dissolving the halogenated alkali metal or alkali earth metal into a conductive solution of halide salts; and electrolyzing the halogenated alkali metal or alkali earth metal to, in turn, separate the alkali metal or alkali earth metal from the halogen.

* * * * *